(12) United States Patent
Williams et al.

(10) Patent No.: US 7,556,290 B2
(45) Date of Patent: Jul. 7, 2009

(54) AIRBAG CUSHION WITH A LACED VENT TO OPTIONALLY VENT GAS FOR OUT-OF-POSITION CONDITIONS

(75) Inventors: Jeffrey D. Williams, Roy, UT (US); Larry D. Rose, South Weber, UT (US)

(73) Assignee: Autoliv ASP, Inc., Ogden, UT (US)

( * ) Notice: Subject to any disclaimer, the term of this patent is extended or adjusted under 35 U.S.C. 154(b) by 182 days.

(21) Appl. No.: 11/528,118

(22) Filed: Sep. 27, 2006

(65) Prior Publication Data

US 2008/0073890 A1    Mar. 27, 2008

(51) Int. Cl.
    *B60R 21/16* (2006.01)
(52) U.S. Cl. ................................... 280/743.1
(58) Field of Classification Search ............. 280/743.1, 280/743.2, 739, 740
    See application file for complete search history.

(56) References Cited

U.S. PATENT DOCUMENTS

| | | | |
|---|---|---|---|
| 5,016,913 A | 5/1991 | Nakajima et al. | |
| 5,172,933 A | 12/1992 | Strasser | |
| 5,246,250 A | 9/1993 | Wolanin et al. | |
| 5,280,953 A | 1/1994 | Wolanin et al. | ............. 280/739 |
| 5,306,043 A | 4/1994 | Mihm et al. | |
| 5,350,188 A | 9/1994 | Sato | |
| 5,405,166 A | 4/1995 | Rogerson | |
| 5,421,607 A | 6/1995 | Gordon | |
| 5,492,363 A | 2/1996 | Hartmeyer et al. | |
| 5,494,314 A | 2/1996 | Kriska et al. | |
| 5,603,526 A | 2/1997 | Buchanan | |
| 5,931,497 A | 8/1999 | Fischer | |
| 6,056,318 A | 5/2000 | Braunschadel | |
| 6,095,557 A | 8/2000 | Takimoto et al. | |
| 6,126,196 A | 10/2000 | Zimmerman | |
| 6,139,048 A | 10/2000 | Braunschädel | ........... 280/728.1 |
| 6,183,003 B1 | 2/2001 | Matsuhashi et al. | |
| 6,206,408 B1 | 3/2001 | Schneider | |
| 6,247,726 B1 | 6/2001 | Ryan | |
| 6,290,257 B1 | 9/2001 | Bunce et al. | ................. 280/739 |
| 6,371,509 B1 | 4/2002 | Ellerbrok et al. | |
| 6,398,258 B2 | 6/2002 | Hamada et al. | |
| 6,631,921 B1 | 10/2003 | Drossler et al. | |
| 6,631,922 B2 | 10/2003 | Hess et al. | ................ 280/730.2 |
| 6,648,371 B2 | 11/2003 | Vendely et al. | ............. 280/739 |

(Continued)

FOREIGN PATENT DOCUMENTS

DE    196 40 332    3/1996

(Continued)

OTHER PUBLICATIONS

Office Action issued Nov. 12, 2088 in co-pending U.S. Appl. No. 11/528,265.

(Continued)

*Primary Examiner*—Faye M. Fleming
(74) *Attorney, Agent, or Firm*—Sally J Brown; Stoel Rives LLP

(57) ABSTRACT

An airbag cushion is disclosed for use in automotive protective systems. The airbag cushion includes at least one laced vent for re-directing gas out of the cushion when an obstruction is encountered.

23 Claims, 8 Drawing Sheets

U.S. PATENT DOCUMENTS

| | | | |
|---|---|---|---|
| 6,746,045 | B2 | 6/2004 | Short et al. |
| 6,773,027 | B2 | 8/2004 | Bohn et al. |
| 6,773,030 | B2 | 8/2004 | Fischer |
| 6,832,778 | B2 | 12/2004 | Pinsenschaum et al. |
| 6,863,304 | B2 | 3/2005 | Reiter et al. |
| 6,918,613 | B2 | 7/2005 | Short et al. |
| 6,932,385 | B2 | 8/2005 | Hawthorn et al. |
| 6,971,671 | B2 | 12/2005 | Schneider et al. |
| 7,059,634 | B2 | 6/2006 | Bossecker et al. ........... 280/739 |
| 7,083,191 | B2 | 8/2006 | Fischer |
| 7,083,192 | B2 | 8/2006 | Fischer et al. |
| 7,210,702 | B2 | 5/2007 | Soderquist |
| 7,237,802 | B2 | 7/2007 | Rose et al. |
| 7,261,319 | B2 * | 8/2007 | DePottey et al. ............ 280/739 |
| 7,328,915 | B2 | 2/2008 | Smith et al. |
| 7,347,450 | B2 * | 3/2008 | Williams et al. ............ 280/739 |
| 7,360,789 | B2 | 4/2008 | Bito |
| 7,364,192 | B2 | 4/2008 | Braun et al. |
| 2003/0020266 | A1 | 1/2003 | Vendely et al. |
| 2003/0020268 | A1 | 1/2003 | Reiter et al. |
| 2003/0057691 | A1 | 3/2003 | Tokita et al. |
| 2003/0127839 | A1 | 7/2003 | Jenkins |
| 2003/0209895 | A1 | 11/2003 | Gu |
| 2003/0214125 | A1 | 11/2003 | Schneider et al. |
| 2004/0012179 | A1 | 1/2004 | Pinsenschaum et al. |
| 2004/0056459 | A1 | 3/2004 | Kassman et al. |
| 2004/0090054 | A1 | 5/2004 | Bossecker et al. |
| 2004/0130135 | A1 | 7/2004 | Ekdahl |
| 2004/0188990 | A1 | 9/2004 | Short et al. |
| 2004/0256842 | A1 | 12/2004 | Breed et al. |
| 2005/0052008 | A1 | 3/2005 | Rose et al. |
| 2005/0098990 | A1 | 5/2005 | Pinsenschaum et al. |
| 2005/0236822 | A1 | 10/2005 | Rose et al. |
| 2005/0248137 | A1 | 11/2005 | Delventhal et al. |
| 2006/0071461 | A1 * | 4/2006 | Williams et al. ............ 280/739 |
| 2006/0071462 | A1 | 4/2006 | Smith et al. |
| 2006/0151979 | A1 | 7/2006 | DePottey et al. |
| 2006/0197327 | A1 | 9/2006 | Maripudi et al. |
| 2006/0202454 | A1 | 9/2006 | Parizal et al. |
| 2007/0052222 | A1 | 3/2007 | Higuchi et al. |
| 2007/0108750 | A1 * | 5/2007 | Bauer et al. ................. 280/740 |
| 2007/0126219 | A1 | 6/2007 | Williams |
| 2007/0132222 | A1 | 6/2007 | Thomas et al. |
| 2007/0205590 | A1 * | 9/2007 | Klinkenberger et al. .. 280/743.2 |
| 2008/0007038 | A1 | 1/2008 | Fischer et al. |
| 2008/0018086 | A1 | 1/2008 | Ford et al. |
| 2008/0023950 | A1 * | 1/2008 | Kalczynski et al. ......... 280/739 |
| 2008/0073890 | A1 | 3/2008 | Williams et al. |
| 2008/0073891 | A1 | 3/2008 | Rose et al. |
| 2008/0073893 | A1 | 3/2008 | Schneider |
| 2008/0079250 | A1 * | 4/2008 | Boyle et al. ................. 280/739 |

FOREIGN PATENT DOCUMENTS

| | | |
|---|---|---|
| JP | 05085295 | 4/1993 |
| JP | 2001-158315 | 6/2001 |

OTHER PUBLICATIONS

Office Action issued Nov. 18, 2008 in co-pending U.S. Appl. No. 11/528,265.
Preliminary Amendment filed Jun. 8, 2007 in co-pending U.S. Appl. No. 11/589,316.
Office Action issued Nov. 17, 2008 in co-pending U.S. Appl. No. 11/589,316.
Interview Summary issued Dec. 19, 2008 in co-pending U.S. Appl. No. 11/589,316.
Office Action issued Mar. 15, 2006 in co-pending U.S. Appl. No. 10/832,843..
Response to First Office Action filed in co-pending U.S. Appl. No. 10/832,843.
Interview Summary issued Jun. 15, 2006 in co-pending U.S. Appl. No. 10/832,843.
Notce of Allowance issued Jun. 22, 2006 in co-pending U.S. Appl. No. 10/832,843.
Request for Continued Examination filed Sep. 20, 2006 in co-pending U.S. Appl. No. 10/832,843.
Notice of Allowance issued Oct. 3, 2006 in co-pending U.S. Appl. No. 10/832,843.
Office Action issued Sep. 27, 2006 in co-pending U.S. Appl. No. 10/959,387.
Interview Summary issued Jan. 23, 2007 in co-pending U.S. Appl. No. 10/959,387.
Amendment and response to Office Action filed Feb. 20, 2007 in co-pending U.S. Appl. No. 10/959,387.
Office Action issued May 2, 2007 in co-pending U.S. Appl. No. 10/959,387.
Office Action issued May 2, 2007 in co-pending U.S. Appl. No. 10/959,387.
Amendment and Response to Office Action filed Aug. 7, 2007 in co-pending U.S. Appl. No. 10/959,387.
Notice of Allowance issued Oct. 5, 2007 in co-pending U.S. Appl. No. 10/959,387.
Office Action issued Jun. 8, 2007 in co-pending U.S. Appl. No. 11/296,031.
Amendment and Response to Office Action filed Dec. 4, 2007 in co-pending U.S. Appl. No. 11/296,031.
Office Action issued Apr. 21, 2008 in co-pending U.S. Appl. No. 11/296,031.
Amendment and Response to Office Action filed Jul. 21, 2008 in co-pending U.S. Appl. No. 11/296,031..
Office Action issued Oct. 21, 2008 in co-pending U.S. Appl. No. 11/296,031.
Preliminary Amendment filed Mar. 10, 2005 in co-pending U.S. Appl. No. 10/959,256.
Office Action issued Nov. 15, 2006 in co-pending U.S. Appl. No. 10/959,256.
Interview Summary issued Jan. 23, 2007 in co-pending U.S. Appl. No. 10/959,256.
Amendment and Response to Office Action issued Feb. 15, 2007 in co-pending U.S. Appl. No. 10/959,256.
Office Action issued May 21, 2007 in co-pending U.S. Appl. No. 10/959,256.
Amendment and Response to Office Action issued Aug. 16, 2007 in co-pending U.S. Appl. No. 10/959,256.
Notice of Allowance issued Nov. 27, 2007 in co-pending U.S. Appl. No. 10/959,256.
Office Action issued Jan. 2, 2009 in co-pending U.S. Appl. No. 11/528,042.
Office Action issued Jun. 30, 2009 in co-pending U.S. Appl. No. 11/528,266.
Amendment and Response to Office Action filed Dec. 1, 2008 in co-pending U.S. Appl. No. 11/528,266.
Interview Summary issued Dec. 16, 2008 in co-pending U.S. Appl. No. 11/528,266.
Notice of Allowance issued Jan. 14, 2009 in co-pending U.S. Appl. No. 11/528,266.
Summary of Interview filed Jan. 16, 2009 in co-pending U.S. Appl. No. 11/528,266.
Office Action issued Dec. 2, 2008 in co-pending U.S. Appl. No. 11/758,419.
Office Action issued Apr. 7, 2008 in co-pending U.S. Appl. No. 11/295,953.
Office Action issued Jul. 1, 2008 in co-pending U.S. Appl. No. 11/295,953.
Amendment and Response to Office Action filed Dec. 1, 2008 in co-pending U.S. Appl. No. 11/295,953.
Office Action filed Sep. 26, 2006 in co-pending U.S. Appl. No. 11/031,391.
Interview Summary issued Jan. 23, 2007 in co-pending U.S. Appl. No. 11/031,394.
Amendment and Response to Office Action filed Mar. 26, 2007 in co-pending U.S. Appl. No. 11/031,394.

Notice of Allowance issued May 7, 2007 in co-pending U.S. Appl. No. 11/031,394.

Office Action filed Jun. 25, 2007 in co-pending U.S. Appl. No. 11/031,394.

Notification of Transmittal of the International Search Report and the Written Opinion of the International Searching Authority issued Oct. 19, 2009 in International Application No. PCT/US2005/027255.

Notification of Transmittal of the International Search Report and the Written Opinion of the International Searching Authority issued Dec. 15, 2006 in International Application No. PCT/US2005/027255.

Notification of Transmittal of the International Search Report and the Written Opinion of the International Searching Authority issued Aug. 20, 2007 in International Application No. PCT/US2006/045367.

Notification of Transmittal of the International Search Report and the Written Opinion of the International Searching Authority issued Sep. 5, 2007 in International Application No. PCT/US2006/045441.

Notification of Transmittal of the International Search Report and the Written Opinion of the International Searching Authority issued Mar. 9, 2007 in International Application No. PCT/US2005/038175.

Notification of Transmittal of the International Search Report and the Written Opinion of the International Searching Authority issued Oct. 22, 2009 in International Application No. PCT/US2008/071337.

Notification of Transmittal of the International Search Report and the Written Opinion of the International Searching Authority issued Aug. 15, 2008 in International Application No. PCT/US2008/060226.

* cited by examiner

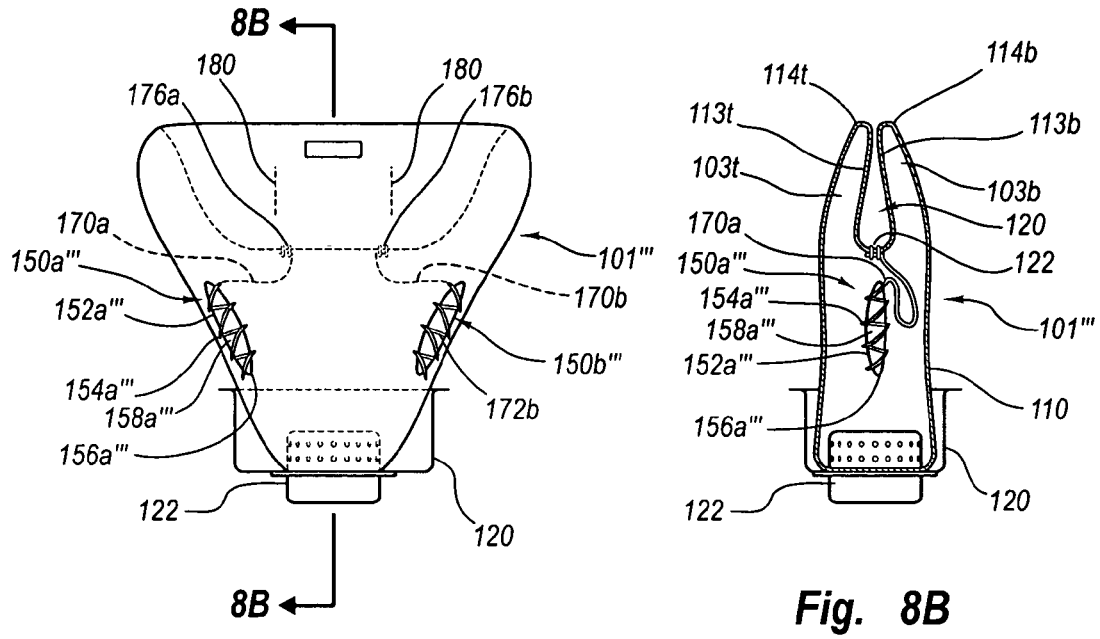
Fig. 8A
Fig. 8B
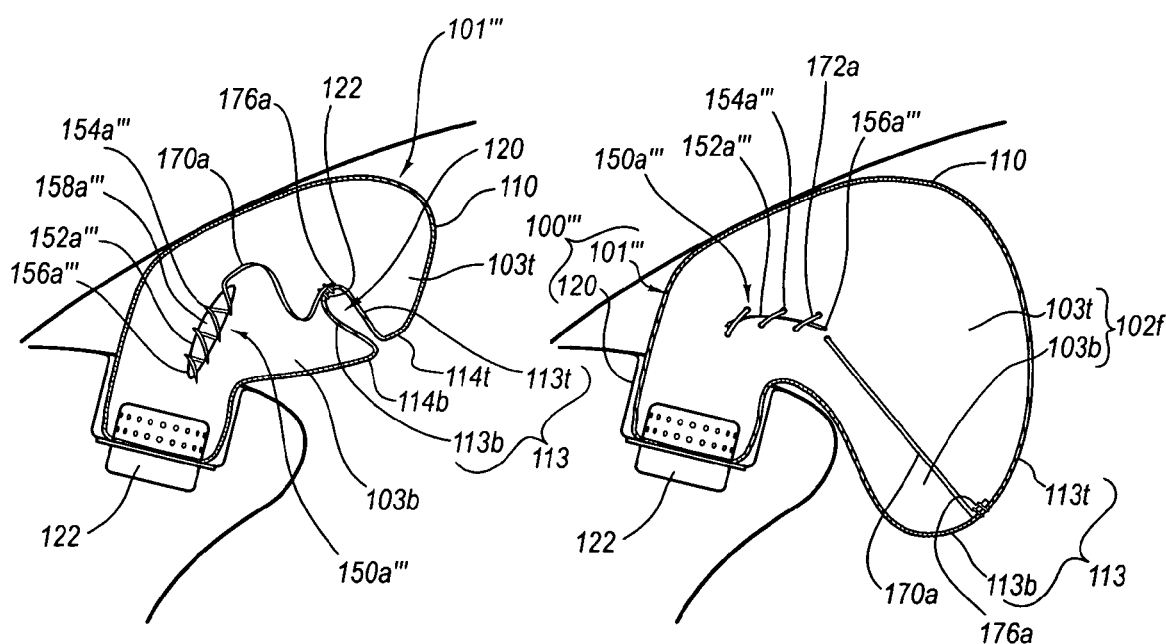
Fig. 9A
Fig. 9B

AIRBAG CUSHION WITH A LACED VENT TO OPTIONALLY VENT GAS FOR OUT-OF-POSITION CONDITIONS

TECHNICAL FIELD

The present invention relates generally to the field of automotive protective systems. More specifically, the present invention relates to inflatable airbags for automobiles.

BRIEF DESCRIPTION OF THE DRAWINGS

Understanding that drawings depict only typical embodiments of the invention and are not therefore to be considered to be limiting of its scope, the invention will be described and explained with additional specificity and detail through the use of the accompanying drawings as listed below.

FIG. 8A is a top plan view of an airbag which has its front portion folded and held in place by breakaway stitching in preparation for being further folded for placement in an automobile.

FIG. 8B is a cross-sectional view of the partially folded airbag shown in FIG. 8A with the front portion divided into a top section and a bottom section by a fold. The cross-sectional view is taken along cutting line 8B-8B in FIG. 8A.

FIG. 9A is a cross-sectional view of the airbag as it is deployed which shows the slack in the cord due to the fold during initial deployment.

FIG. 9B is a cross-sectional view of the airbag after it is fully deployed.

Figure 1:
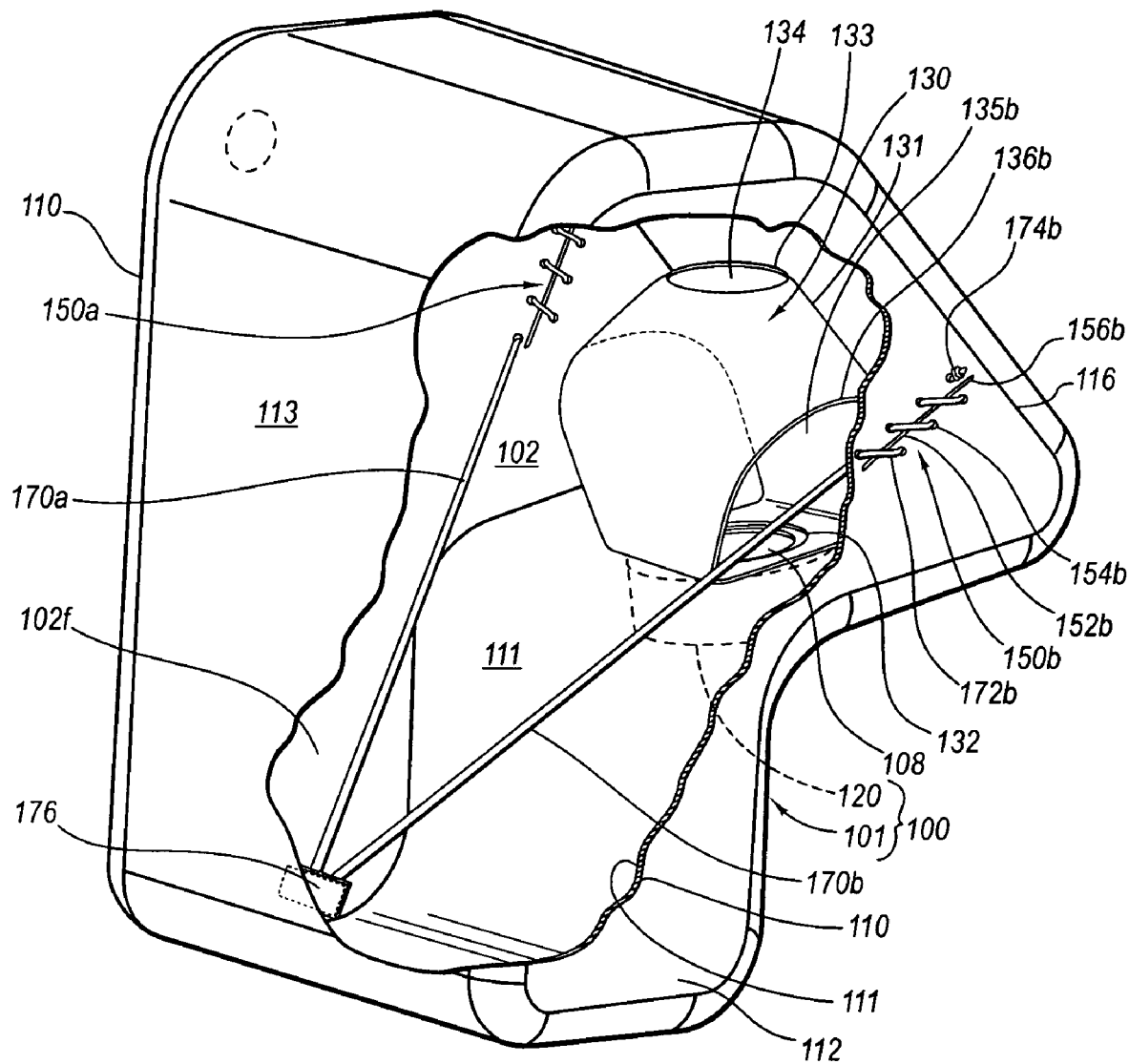
FIG. 1 is a perspective view of an airbag cushion with a partial cut-away to show the cords, laced vents and a diffuser.

INDEX OF ELEMENTS IDENTIFIED IN THE DRAWINGS 30 occupant
100 airbag module
101 airbag cushion
102 interior of the airbag cushion 101
102f front portion of interior 102
103t top section of front portion 102f
103b bottom section of front portion 102f
108 throat
110 membrane
111 interior surface of airbag cushion membrane
112 exterior surface of the airbag cushion membrane
113 face surface
114 tips
116 seam
118 fold
119 base of fold
120 airbag module housing
122 inflator
130 diffuser
131 material
132 opening
133 perimeter of direct opening 134
134 direct opening of diffuser
135 side openings
136 perimeter of side openings 135
150 laced vent
152 sides
154 holes
156 ends
158 vent apertures
160 fixed vent
170 control cord
172 laced portions
174 retention knots
176 cord attachment
180 tack stitch

DETAILED DESCRIPTION OF PREFERRED EMBODIMENTS

Described below are embodiments of an airbag cushion and venting mechanism. As those of skill in the art will appreciate, the principles of the invention may be applied to and used with a variety of airbag deployment systems including frontal driver and passenger airbags, knee airbags, overhead airbags, curtain airbags, and the like. Thus, the present invention is applicable to airbag cushions of various shapes and sizes.

Airbag cushions are frequently located in an instrument panel and directly in front of an occupant. During a collision, an airbag cushion inflates and deploys through a cosmetic cover. The airbag cushion deploys towards the occupant and provides a restraint.

Full inflation of an airbag is not always desired. For example, partial inflation offers optimal protection when the occupant being protected by the airbag cushion is a child, a baby in a rear facing car seat or an adult positioned too close to the air bag cushion. Such conditions are referred to as out-of-position conditions. Embodiments described below provide an airbag cushion that responds to an occupant's position and vents accordingly to avoid excessive deploying impact.

Embodiments disclosed herein permit response to occupant position and vents accordingly. Each embodiment has a closeable opening for venting gas such as a laced vent. Each laced vent may be closed via a component such as a control cord. The cord may be connected at one end to a laced vent and at an opposing end within the cushion. A diffuser may also be positioned in the cushion to optimize the flow of gas out of the laced vents. It is desirable to include a diffuser in most embodiments of the cushion due to the ability of a diffuser to enable the rapid escape of the gas out of the cushion via the laced vents.

If an occupant is in close proximity to the deploying airbag and restricts normal inflation, the laced vent remains open and allows gas to rapidly escape. If the occupant is in a normal position and inflation is unrestricted, the tension pulls on the cord to quickly close the laced vent. Closure retains gas for normal occupant restraint. Thus, the laced vent may be used as a variable feature in out-of-position conditions and in normal restraint conditions. In this manner, the airbag cushion is sensitive to obstructive expansion of the cushion.

With reference now to the accompanying figures, particular embodiments of the invention will now be described in greater detail. One embodiment of airbag module 100 is shown in FIG. 1 and FIGS. 2A-2C comprising an airbag cushion 101 and a housing 120. FIG. 1 is a perspective view which shows housing 120 of airbag module 100 having an inflator 122 (not shown in FIG. 1) delivering gas into an airbag cushion 101 of airbag module 100 via a diffuser 130 within airbag cushion 101. Laced vents 150*a*-*b* are closed as laced portions 172*a*-*b* of control cords 170*a*-*b* have been pulled taut by expansion of the cushion due to the pressure of the gas in airbag cushion 101.

Figure 2A:
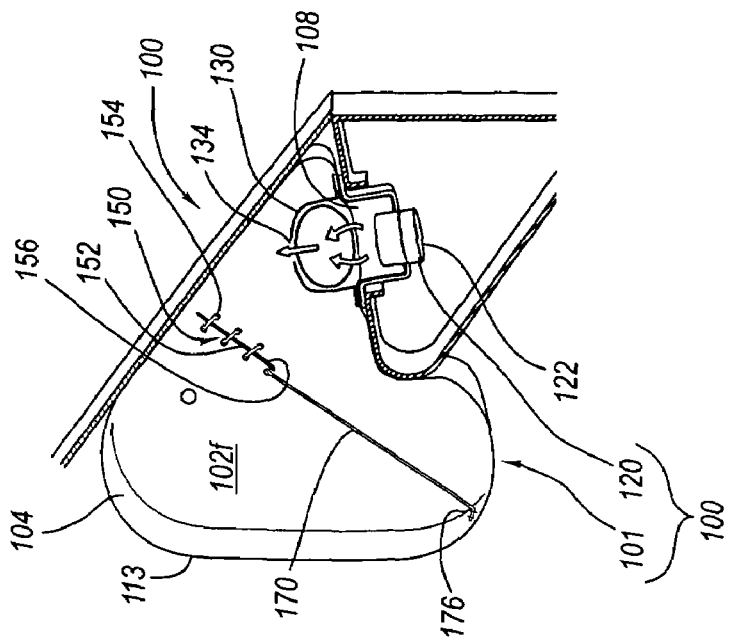
FIG. 2A is a cross-sectional view of a deploying airbag cushion.
Figure 2B:
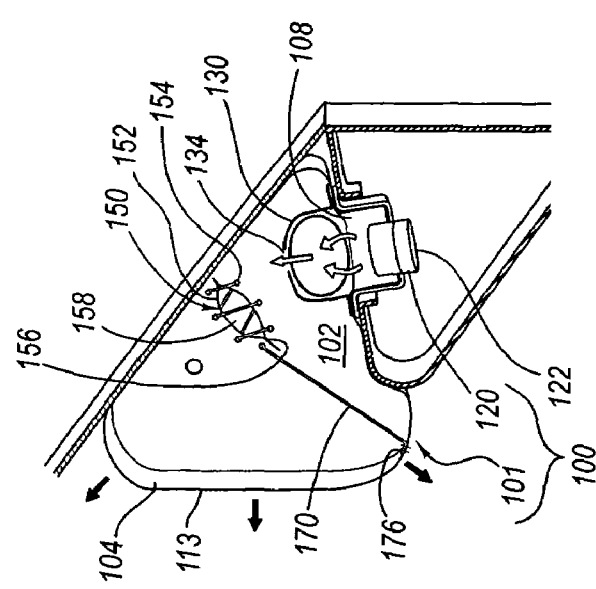
FIG. 2B is a cross-sectional view of the deploying airbag cushion of FIG. 2A.
Figure 2C:
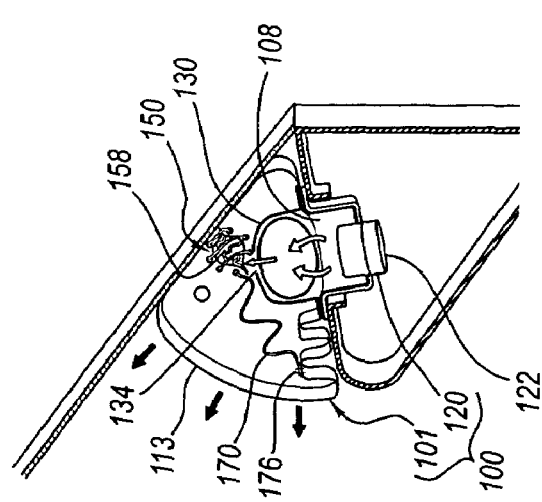
FIG. 2C is a cross-sectional view of an embodiment of a deploying airbag cushion of FIGS. 2A and 2B.
Figure 6A:
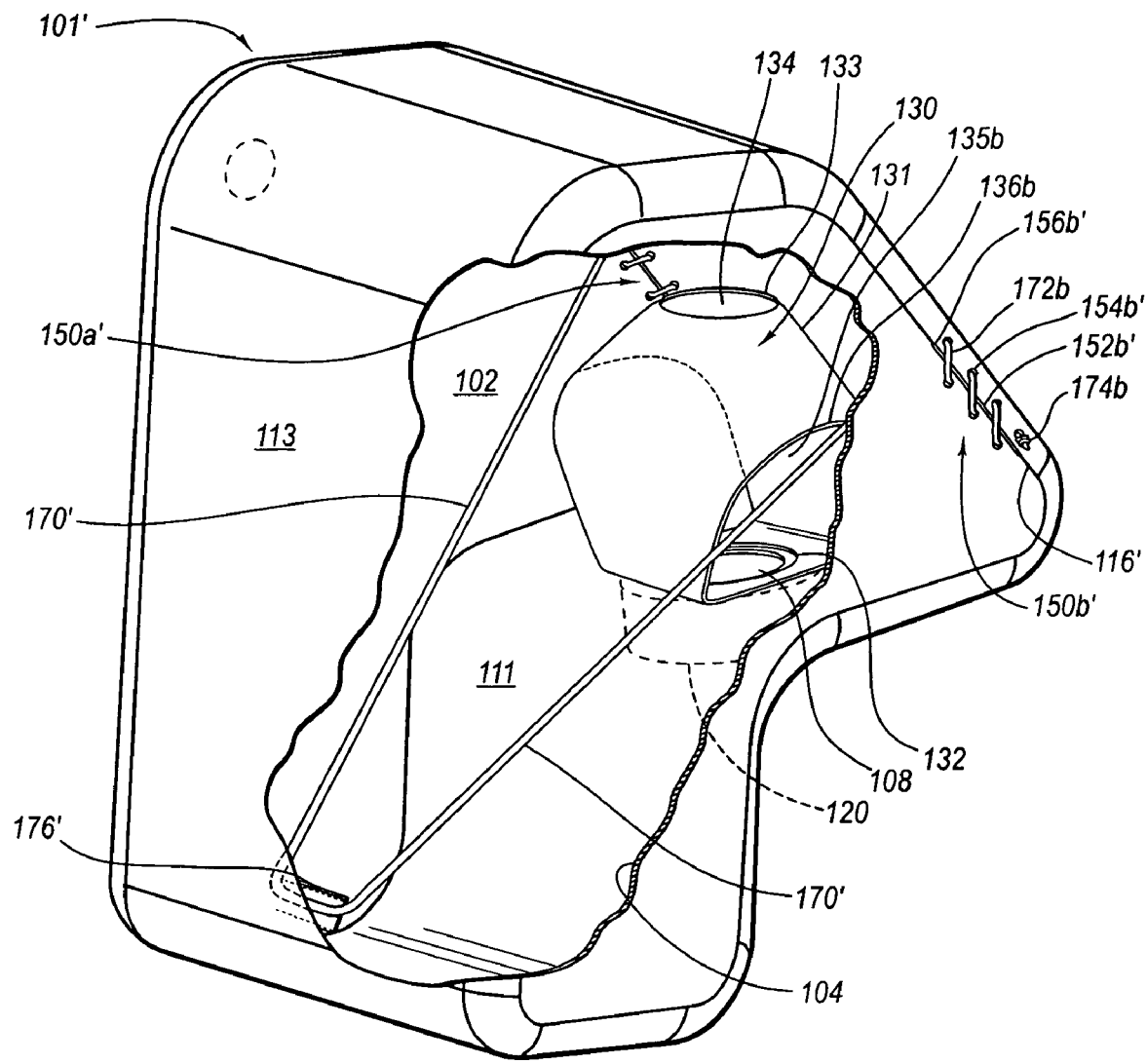
FIG. 6A is a perspective view of alternative embodiment of an airbag cushion with a partial cut-away to show the cords, laced vents and a diffuser. This embodiment is similar to the embodiment shown in FIG. 1 but the laced vent has a different location and the cord passes through a cord attachment which acts as a loop and allows the cord to move.
Figure 6B:
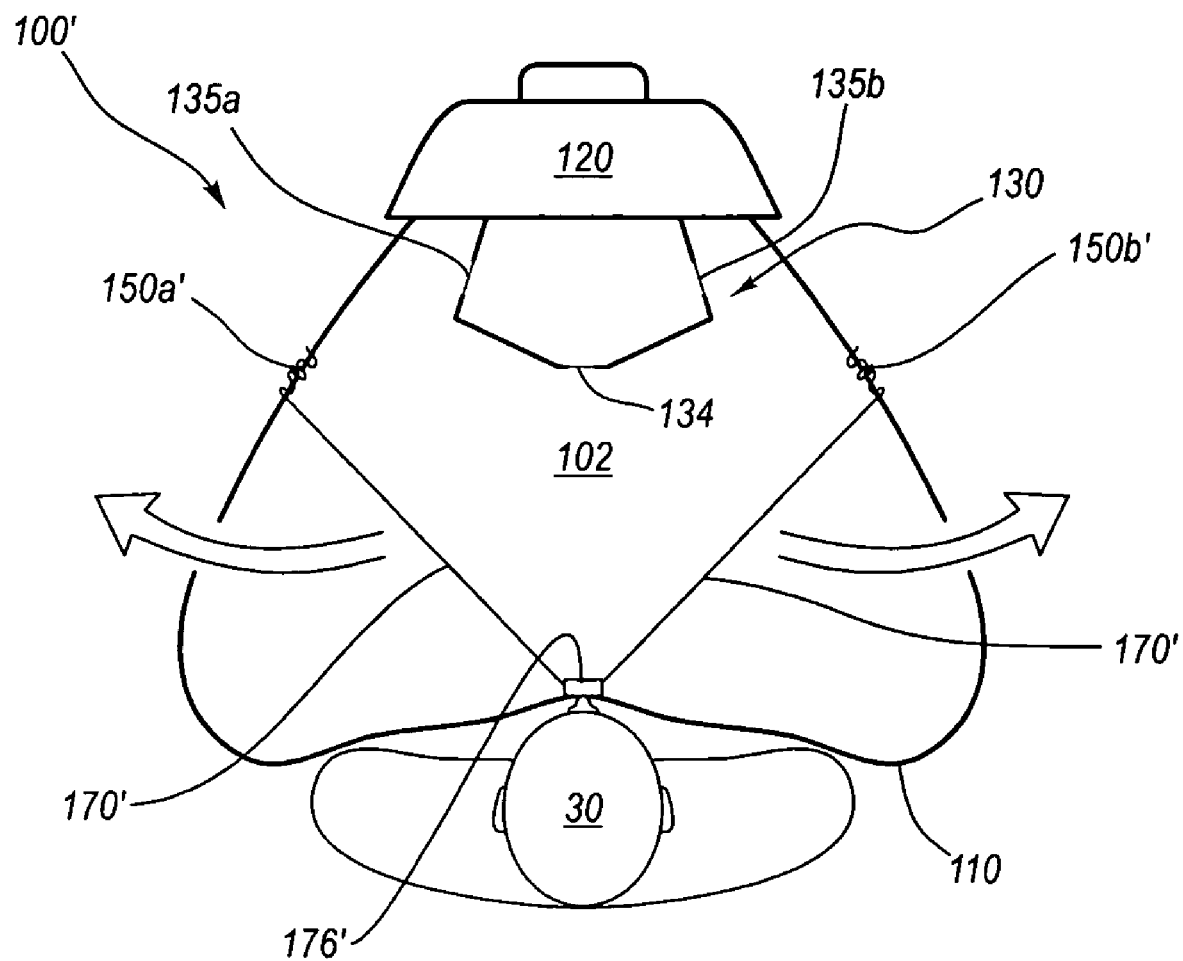
FIG. 6B is a cross-sectional view of an alternative embodiment of the deployed airbag cushion shown in FIG. 6A.

Some of the structures of the airbag cushion 101 are best seen with reference to FIGS. 2A-2C. Airbag cushion 101 has an interior 102. Airbag cushion 101 also has a membrane 110 with an interior surface 111 and exterior surface 112. Vent aperture 158 in the membrane provides an opening for gas to exit interior 102 of airbag cushion 101 via laced vents 150. Gas enters interior 102 via another opening in the membrane, throat 108. Cord attachment 176 is a portion of interior surface 111 which serves as an anchor for an end of cord 170. Alternatively, cord 170 is anchored via cord attachment 176' as shown in FIGS. 6A-6B which is essentially a loop that permits movement of cord 170. The cord attachment may be disposed elsewhere such as proximate to a different portion of surface 111. Alternatively, the cord attachment may be a portion of exterior surface 112. For example, the cord attachment may be at the bottom of the face surface 113, which is the surface of the airbag cushion directed to the occupant. Thus, cord 170 may extend through the interior 102 of the airbag cushion 101 or may be positioned exterior to the airbag cushion 101. The location of the cord attachment 176 depends on module deployment angle, vehicle interior geometry, and cushion fold type.

Diffuser 130 is configured to create a pressure pocket and re-direct the inflation gas to the laced vents. The embodiment of the diffuser shown in FIG. 1 at 130 is pentagon shaped and comprises a material 131 which may be integral with a surface of cushion 101 or attached to cushion 101. For example, diffuser 130 may be sewn together with the cushion. Diffuser 130 receives gas via throat 108 through opening 132. Perimeter 133 defines direct opening 134. Direct opening 134 assists with normal inflation of cushion 101 to assist in getting cushion 101 in position in time for dynamic loading purposes.

Side openings 135*a* (not shown in FIG. 1) and 135*b* are respectively defined by perimeters 136*a* (not shown in FIG. 1) and 136*b*. The gas is directed out of direct opening 134 and side openings 135*a*-135*b*. Gas directed out of side openings 135*a*-*b* is vented out of laced vents 150*a*-*b*. Note that in other embodiments, the optional diffuser may have other shapes. For example, the diffuser may be rectangular, trapezoidal, hexagonal, round, etc. It may also have a portion which is round or elliptical while other portions are angled.

Figure 5:
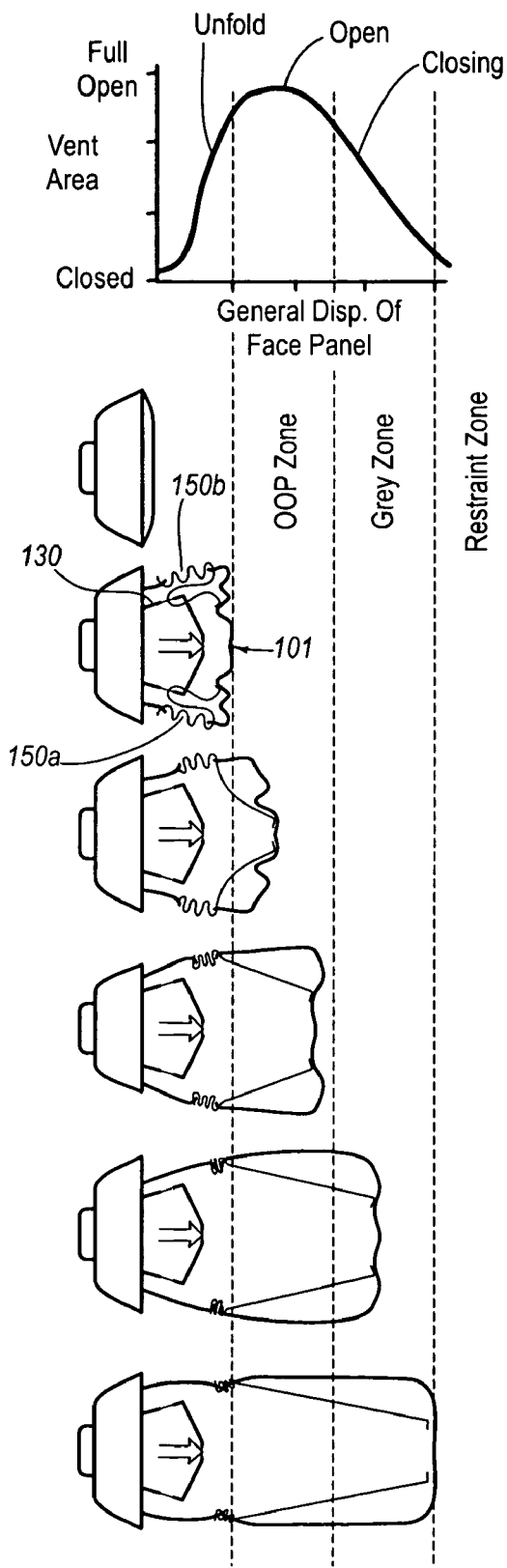
FIG. 5 is a diagram illustrating an airbag cushion venting graph in relation to an airbag cushion's deployment.

Not only are side openings 135*a*-*b* strategically located to redirect the gas flow generally toward laced vents 150*a*-*b* and out of cushion 101 but side openings 135*a*-*b*, are also sized for optimal gas flow. Side openings 135*a*-*b* are large enough to allow most of the gas to flow through them. Only in out-of-position conditions does the focused gas flow from diffuser 130 to the aligned laced vents 150*a*-*b* to allow a more rapid escape of the inflation gas as shown in FIG. 5.

If the occupant is in a normal position and inflation is unrestricted, diffuser 130 functions as normal to re-direct the inflation gas generally toward the vent(s). However, because diffuser 130 and laced vents 150*a*-*b* are independent of each other, the cushion side panels can extend beyond diffuser 130 such that the flow is not aligned or focused with laced vents 150*a*-*b* as shown in FIG. 5. This behavior helps minimize gas leakage. The large vent(s) are quickly closed as the cushion fully expands retaining gas for normal occupant restraint.

FIGS. 2A-2C provide a cross-sectional view of an airbag cushion 101 deploying from a housing 10. For illustrative purposes, a single laced vent 150 is shown in FIGS. 2A-2C but airbag cushion 101 may include multiple vents to provide required +-venting capability as shown in other embodiments.

Laced vent 150 comprises opposing vent sides 152. Opposing sides 152 have holes 154 which receive the closing section 172 of cord 170. The opposing sides 152 come together at ends 156. Sides 152 are located around a vent aperture 158 in the membrane of the inflatable airbag cushion 101. Vent aperture 158 is defined by edges of sides 152. The laced vent may reinforced as needed with a suitable material such as a nylon woven fabric-type or other material known in the art. For example, optional panel strips may also be used to reinforce side 152 which may assist in reducing surface tension when under pressure.

Laced vent 150 is formed by making a slit. A laced vent may also be formed by removing material from surface 111 of the airbag cushion 101 or by not seaming portions of material together. The vent aperture of the laced vent may have any suitable shape. For example, the laced vent may have multiple slits and may be polygonal. Vent aperture 158*a'''* in FIGS. 8A, 8B and 9A has an ellipsoidal shape with rounded ends 156*a'''*. The design permits the laced vent to be a low-stress element in the cushion assembly which is helpful during unfolding of the cushion and pressurization.

As described above, airbag cushion 101 includes a cord 170 that couples or engages the laced vent 150 and couples to a cord attachment which is part of or extends from the interior surface 111 or the exterior surface of airbag cushion 101. The cord 170 may comprise a nylon material or other suitable material known in the art. Each cord has a laced portion. In the embodiment depicted in FIG. 1, laced portions 172*a* and 172*b* respectively terminate in retention knots 174*a* and 174*b*. The laced portions in FIG. 1, 172*a* and 172*b*, feature a pattern of criss-crossing between the holes in the material of the sides which define the vent aperture. For example, laced portion 172*b* extends through the holes 154*b* of sides 152*b* in a configuration such that laced portion 172*b* extends diagonally across the closed slit in FIG. 1. The laced vents in FIG. 1 are referred to herein as being single laced.

In FIG. 2A, the initially deploying airbag cushion 101 has a control cord 170 and the laced vent 150 remains open. In FIG. 2B, the cord 170 is pulled taut and the laced vent 150 begins to close. In FIG. 2C, the cord 170 is completely taut and the laced vent 150 is closed.

Figure 3A:
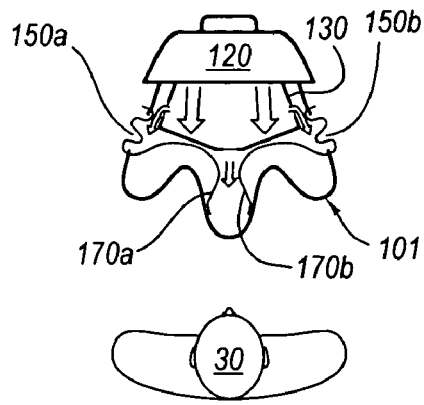
FIG. 3A is a cross-sectional view illustrating initial deployment of an airbag cushion for an occupant in a normal position.
Figure 3B:
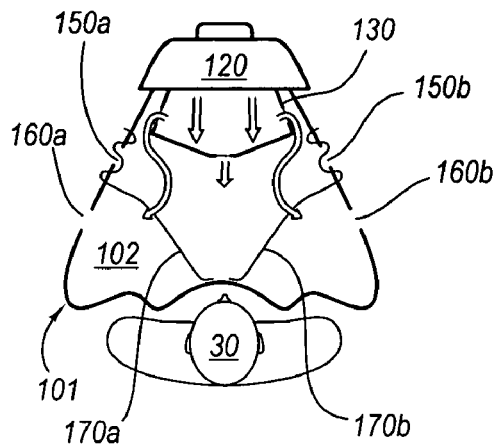
FIG. 3B is a cross-sectional view illustrating a deploying airbag cushion which is partially deployed as it encounters an occupant in a normal position.
Figure 3C:
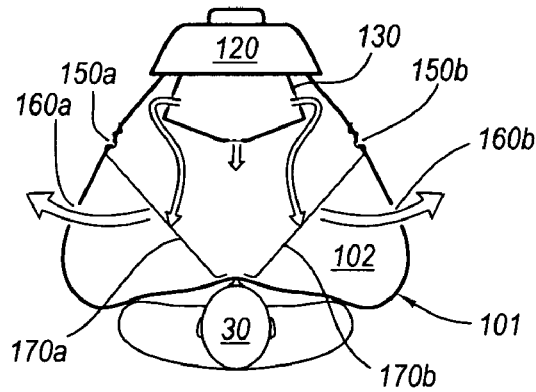
FIG. 3C is a cross-sectional view of an airbag cushion which has closed vents to enable the airbag cushion to fully deploy.

FIGS. 3A-C illustrate three stages of a deploying airbag cushion 101 without obstruction in the deploying path. The depicted airbag cushion 101 includes two laced vents 150a-b symmetrically disposed on the cushion 101 and two fixed vents 160a-b symmetrically disposed on the cushion 101. Fixed vents 160a-b provide consistent venting of the airbag cushion 101 and are not restricted by an occupant's position. In addition to remaining open, fixed vents 160a-b also differ from laced vents 170a-b as fixed vents 160a-b are typically smaller. Fixed vents 160a-b may be optional in certain cushion embodiments based on venting requirements. The locations for laced vents 150a-b and fixed vents 160a-b may vary as does the number of vents. An occupant 30 is in a normal seating position which will allow the airbag cushion 101 to fully expand before impacting the occupant. In this manner, the occupant 30 benefits from the full restraint capability of the airbag cushion 101.

In FIG. 3A, the initial breakout of the airbag cushion 101 occurs. The laced vents 150a-b are open and, in the depicted embodiment, extend from the airbag cushion 101. In FIG. 3B, cords 170a-b which respectively correspond with laced vents 150a-b are pulled taut and gas flow through laced vents 150a-b is restricted. In FIG. 3C, laced vents 150a-b are completely closed, the gas vents through the fixed vents 160a-b, and normal restraint is provided to the occupant 30.

Because cushion 101 is initially in a folded condition, at initial breakout (such as the initial 7 milliseconds), laced vents 150a-b are initially non-functional. If an occupant is not positioned directly in front of the airbag cushion 101, cushion 101 unfolds and is allowed to pressurize normally, and gas is vented through fixed vents 160a-b as the occupant loads cushion 101. Fixed vents 160a-b may be located in the side panels of cushion 101 near laced vents 150a-b, as shown.

Figure 4A:
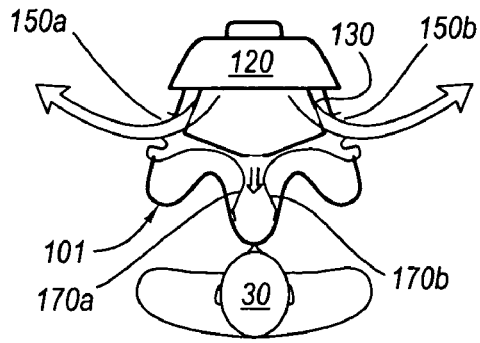
FIG. 4A is a cross-sectional view illustrating initial deployment of an airbag cushion for an out-of-position occupant.
Figure 4B:
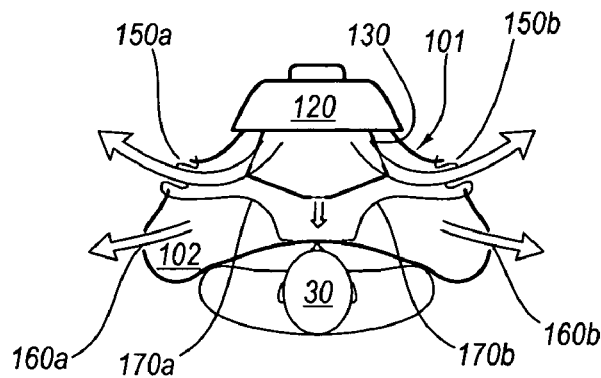
FIG. 4B is a cross-sectional view illustrating a deploying airbag cushion which is only partially deployed as it has encountered an out-of-position occupant.
Figure 4C:
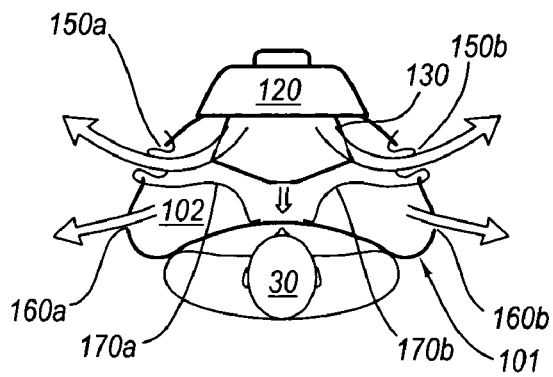
FIG. 4C is a cross-sectional view of an airbag cushion which remains only partially deployed as the laced vents remain open to prevent full deployment of the airbag cushion.

FIGS. 4A-C illustrate three stages of a deploying airbag cushion 101 with obstruction in the deploying path. An occupant 30 is out-of-position and obstructs the deploying airbag cushion 101 and prevents the airbag cushion 101 from fully inflating. In FIG. 4A, airbag cushion 101 begins initial deployment as in FIG. 3A. In FIG. 4B, airbag cushion 101 impacts the occupant 30 and the cords 170a-b remain slack. The laced vents 150a-b remain open and venting rapidly occurs from laced vents 150a-b and fixed vents 160a-b. The cushion inflation is restricted but the occupant 30 receives less than the full deployment loading of the cushion 101. In FIG. 4C, cushion 101 is partially inflated and provides limited restraint. Venting continues through laced vents 150a-b and fixed vents 160a-b.

Referring to FIG. 5, a graph illustrating venting as a function of airbag cushion displacement is shown. For reference, an airbag cushion 101 is shown in various stages of deployment. The airbag cushion 101 includes a diffuser 130 and two symmetrically disposed laced vents 150a-b. During initial deployment, airbag cushion 101 is unfolding and laced vents 150a-b provide little or no venting. Airbag cushion 101 expands into an out-of-position zone where, if obstructed, the laced vents 150a-b will remain completely or nearly open and full venting occurs. In this zone an occupant does not receive the full restraint capability but does benefit from limited restraint. If unobstructed, airbag cushion 101 expands into a gray zone where partial closure of the laced vents 150a-b begins and venting is limited. If further unobstructed, airbag cushion 101 fully expands to the restraint zone. At this zone, laced vents 150a-b completely close and an occupant benefits from the full restraint capability of airbag cushion 101.

Early in a normal inflation, gas loss through laced vent 150a-b is minimal even with diffuser 130. This phenomenon is due to the Bernoulli effect—pressure is lower in a moving fluid than in a stationary fluid. For example, if the convex side of a spoon is placed into a smooth stream of water from a faucet, the spoon is pulled into the stream. The higher pressure outside the moving fluid pushes the spoon into the lower pressure water. In an airbag deployment, the high velocity stream of gas flowing into the cushion creates a similar effect for approximately 30 milliseconds, particularly in the area of throat 108. Since pressure outside the cushion is still atmospheric, there is a pressure imbalance and air flows into the cushion, not out of the cushion, when the vent is positioned alongside of the gas flow stream and not in its path.

Referring to FIGS. 6A-6B, an alternative embodiment of an airbag cushion 101' is shown. Airbag cushion 101' includes two symmetrical laced vents 150a-b that are embodied as described above. FIGS. 6A-6B depict laced vents 150a-b after they have been closed. Rather than having cords corresponding to each laced vent, a single cord 170' is used. Cord 170' is coupled to or engages each laced vent in a manner similar to that previously described. Cord 170' passes through a cord attachment 176' which acts as a loop that is coupled to the interior surface 111 of airbag cushion 101. Cord attachment 176' may be formed of a fabric material similar or identical to that of the airbag cushion 101'. Cord 170' may freely pass through cord attachment 176' and may therefore be referred to as a "floating" cord. In an alternative embodiment, the cord may be disposed on the airbag cushion exterior and pass through a cord loop coupled to an exterior surface of the airbag cushion 101'. Note that upon deployment, the distance from the location of cord attachment 176' to throat 108 is greater than the distance from throat 108 to either laced vent 150a' or 150b'.

Figure 7:
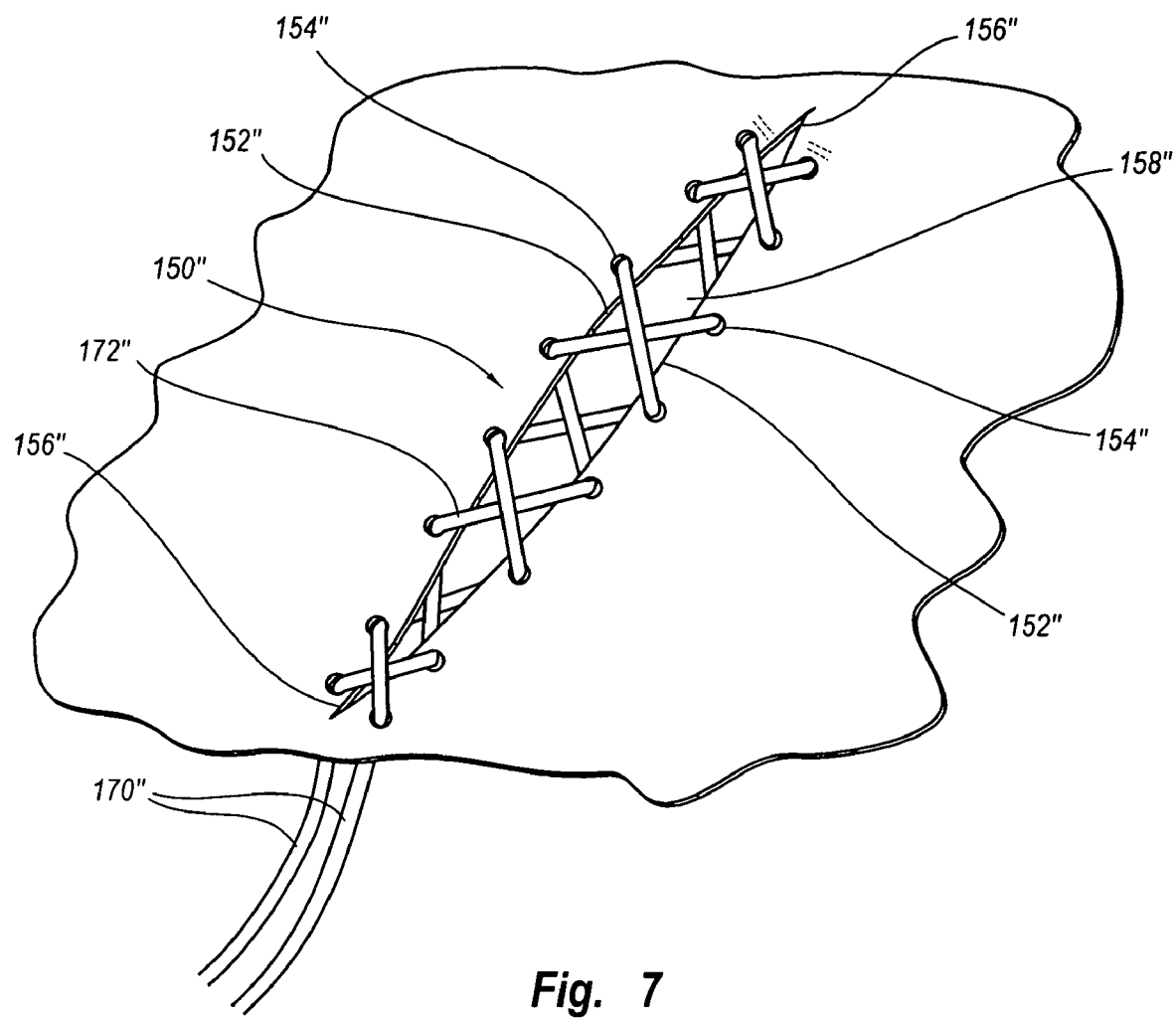
FIG. 7 is a perspective view of a double laced vent.

Airbag cushion 101' in FIGS. 6A-6B also features slit-type laced vents as identified at 150a' and 150b'. Laced vents 150a' and 150b' are co-linear with a seam of the airbag. In contrast to seam 116 in FIG. 1 which attaches two pieces of material together along its entire length, seam 116' in FIG. 7 is not continuous and the unattached portions form sides 152a' and 152b'. Sides 152a' and 152b' each respectively have holes 154a' and 154b'. The pairs of sides 152a' and 152b' each respectively define a vent aperture. So instead of cutting a slit in the material, laced vents 150a' and 150b' are formed by not seaming the opposing portions of material together. Stated otherwise, the ends of the vent aperture are defined by a seam which joins opposing portions of material together as shown at ends 156b'.

Note that cord 170' and cord attachment 176' can also be used with other laced vents such as laced vents 150a and 150b. Note also that laced vents 150a' and 150b' can also be used with other cords and cord attachments such as cords 170a and 170b and cord attachment 176.

FIG. 7 depicts laced vent 150" which is an example of a double laced configuration. Vent aperture 158" is open as sides 152" have not been brought together yet. Laced portion 172" extend through holes 154" and diagonally across vent aperture 158". Laced portion 172 winds back and forth across vent aperture 158" until it reaches top end 156" and then winds back downward, back and forth across vent aperture 158", until terminating its criss-cross pattern at bottom end 156". The ends of cord 170" can terminate at another vent or elsewhere in airbag cushion 101. The double laced configuration may also be referred to as a "shoelace" configuration.

FIGS. 8A-8B and FIGS. 9A-9B depict an airbag cushion 101''' which has a fold 118 held initially by an optional tack stitch 180 that is advantageous for deployment. Tack stitch 180 is designed to easily and consistently break during deployment and to provide no interference to airbag cushion deployment. Airbag cushion 101''' has cords 170a and 170b which are respectively attached to cord attachments 176a and 176b at one end and terminate at the other end respectively in laced portions 172a and 172b.

Fold 118 has a base 119 which may correspond with the location of the cord attachment(s). After tack stitch 180 ruptures and fold 118 unfolds, cords 170a and 170b move from a slack condition to a tensioned condition. It is advantageous for cords 170a and 170b to be initially loose during the early stages of the airbag deployment. If an out-of-position occupant does not block deployment then cords 170a and 170b become fully tensioned and close laced vents 150a and 150b to enable airbag cushion 101''' to become fully inflated.

Due to fold 118, front portion 102f of interior 102 is divided into a top section 103t and a bottom section 103b as shown in FIGS. 8A-8B and 9A. As also shown in FIGS. 8A-8B and 9A, a top section 103t and a bottom section 103b of face surface 113 are opposite each other when airbag cushion 101''' is folded. FIGS. 8B and 9A also identify tips 114t and 114b which are opposite each other when airbag cushion 101''' is folded but move away from each other as the airbag cushion 101''' is inflated.

Fold 118 also enables cords 170a and 170b to remain slack or loose during shipping and handling. Optional tack stitch 180 acts to ensure that the cords do not prematurely actuate the gas venting features. Tack stitch could be replaced by many similar releasable temporary holding features such as fasteners, adhesives, clips, knots, hook and loop fasteners, etc. Such releasable temporary holding features are examples of means for temporarily and releasably holding a portion of an airbag in a folded configuration. Additional information about the use of a fold such as fold 188 is provided in U.S. patent application Ser. No. 11/528,265 titled PRE-FOLDED AIRBAG CUSHION WITH OPTIONAL VENTING FOR OUT-OF-POSITION CONDITIONS which was filed on Sept. 27, 2006. This application is hereby incorporated by reference.

Embodiments of vents which can be closed via a tether attached to the membrane cushion are also disclosed in U.S. patent application Ser. No. 11/528,266 titled AIRBAG CUSHION WITH A FLAP VENT TO OPTIONALLY VENT GAS FOR OUT-OF-POSITION CONDITIONS which was filed on Sep. 27, 2006; U.S. patent application Ser. No. 11/296,031 titled AIRBAG CUSHION WITH DIFFUSER AND CINCH TUBE TO VENT GAS FOR OUT-OF-POSITION CONDITIONS which was filed on Dec. 7, 2005; U.S. patent application Ser. No. 11/295,953 titled LOCKING MECHANISM FOR A CINCH TUBE TO VENT GAS OF AN AIRBAG CUSHION which was filed on Dec. 7, 2005; U.S. patent application Ser. No. 10/959,256 titled AIRBAG CUSHION WITH VENT FOR REDUCED OUT-OF-POSITION EFFECTS which was filed on Oct. 6, 2004; U.S. patent application Ser. No. 10/959,387 titled AIRBAG CUSHION WITH TETHER DEACTIVATED VENTING FOR REDUCED OUT-OF-POSITION EFFECTS which was filed on Oct. 6, 2004; and U.S. patent application Ser. No. 10/832,843 titled CUSHION VENTING DESIGN FOR OUT OF POSITION OCCUPANT PROTECTION which was filed on Apr. 27, 2004. These applications are hereby incorporated by reference.

Embodiments disclosed herein illustrate novel techniques for venting an airbag cushion to retain an open vent when an occupant obstructs the path of a deploying cushion and to close and remain closed when an occupant does not obstruct a deploying cushion. Airbag cushions provide improved safety by deploying with less pressure when an occupant is obstructing deployment. The airbag cushions deploy with more pressure when an occupant is not obstructing deployment and when high pressure is required to provide the necessary restraint. The airbag cushions described herein have application to both driver and passenger positions. Furthermore, the airbag cushions may be configured in a variety of sizes based on design constraints.

Various embodiments for vents have been disclosed herein. The vents disclosed herein are examples of means for venting gas out of the airbag. The diffusers disclosed herein are examples of means for diffusing gas by re-directing inflation gas to the venting means from an inflator such that the gas rapidly exits the inflatable airbag cushion via the venting means when deployment of the airbag is obstructed.

It will be apparent to those having skill in the art that changes may be made to the details of the above-described embodiments without departing from the underlying principles of the invention. Embodiments of the invention in which an exclusive property or privilege is claimed are defined as follows. Note that elements recited in means-plus-function format are intended to be construed in accordance with 35 U.S.C. § 112 ¶6.

The invention claimed is:

1. An airbag module, comprising:
   an inflatable airbag cushion having a cushion membrane;
   at least one laced vent comprising opposing vent sides around a vent aperture in the membrane of the inflatable airbag cushion, wherein the vent aperture is defined by edges of the sides; and
   a cord coupled to the cushion membrane of the inflatable airbag cushion and having a laced portion which extends across the vent aperture between the opposing vent sides in a configuration such that upon deployment of the inflatable airbag cushion with obstruction, the cord does not fully extend and the vent remains open, and upon deployment of the inflatable airbag cushion without obstruction, the cord extends and at least partially closes the vent.

2. The airbag module of claim 1, wherein the vent aperture of the laced vent is formed by making a slit in the inflatable airbag cushion.

3. The airbag module of claim 1, wherein the vent aperture of the laced vent has ends which are defined by a seam which joins opposing portions of material together.

4. The airbag module of claim 1, wherein the vent aperture of the laced vent is formed by cutting a portion out of the inflatable airbag cushion.

5. The airbag module of claim 1, wherein each side has a plurality of holes, and the laced portion of the cord extends through the holes and diagonally across the vent aperture.

6. The airbag module of claim 1, wherein the laced portion of the cord extends diagonally across the vent aperture in a single laced configuration.

7. The airbag module of claim 1, wherein the laced portion of the cord extends diagonally across the vent aperture in a double laced configuration.

8. The airbag module of claim 1, wherein the cord is fixedly attached to the cushion membrane of the inflatable airbag cushion.

9. The airbag module of claim 1, wherein the cord is fixedly attached to the cushion membrane of the inflatable airbag cushion via a cord attachment.

10. The airbag module of claim 1, further comprising a cord attachment which is attached to the cushion membrane of the inflatable airbag cushion and is configured to permit the cord to pass through as the cord moves.

11. The airbag module of claim 1, further comprising a diffuser configured to receive inflation gas and re-direct inflation gas to the laced vent from an inflator such that the gas rapidly exits the inflatable airbag cushion via the laced vent when deployment of the airbag is obstructed.

12. The airbag module of claim 1, wherein the diffuser has an opening to receive gas and at least one opening to re-direct the gas to the vent.

13. The airbag module of claim 11, wherein the diffuser is configured for alignment with the laced vent if deployment is obstructed.

14. The airbag module of claim 11, wherein the vent and the diffuser are configured to become non-aligned if deployment is not obstructed.

15. The airbag module of claim 11, wherein the diffuser and the vent are configured to be aligned if deployment is obstructed to permit rapid venting of inflation gas, and wherein the diffuser and the vent are configured for transition to non-alignment if deployment is not obstructed.

16. The airbag module of claim 1, further comprising a fixed vent disposed on the airbag and adapted to vent gas during airbag deployment with and without obstruction.

17. An airbag module, comprising:
an inflatable airbag cushion having a cushion membrane;
a first laced vent comprising first opposing vent sides around a first vent aperture in the membrane of the inflatable airbag cushion, wherein the first vent aperture is defined by edges of the first vent sides,
a second laced vent comprising second opposing vent sides around a second vent aperture in the membrane of the inflatable airbag cushion, wherein the second vent aperture is defined by edges of the second vent sides; and
at least one cord coupled to the cushion membrane of the inflatable airbag cushion and having a first laced portion and a second laced portion,
wherein the first laced portion extends across the first vent aperture of the inflatable airbag cushion between the opposing first vent sides and wherein the second laced portion extends across the second vent aperture of the inflatable airbag cushion between the opposing second vent sides such that, upon deployment of the inflatable airbag cushion with obstruction, the cord does not fully extend and the first laced vent and the second laced vent remain open, and upon deployment of the inflatable airbag cushion without obstruction, the cord extends and at least partially closes the first laced vent and the second laced vent.

18. The airbag module of claim 17, wherein each first vent side has a plurality of holes, and the first laced portion of the cord extends through the holes and diagonally across the first vent aperture; and
wherein each second vent side has a plurality of holes, and the second laced portion of the cord extends through the holes and diagonally across the second vent aperture.

19. The airbag module of claim 18, wherein the first laced portion of the cord extends diagonally across the first vent aperture in a single laced configuration and wherein the second laced portion of the cord extends diagonally across the second vent aperture in a single laced configuration.

20. The airbag module of claim 18, wherein the first laced portion of the cord extends diagonally across the first vent aperture in a double laced configuration and wherein the second laced portion of the cord extends diagonally across the second vent aperture in a double laced configuration.

21. The airbag module of claim 17, further comprising a cord attachment which is attached to the inflatable airbag cushion and is configured to permit the cord to pass through as the cord moves.

22. The airbag module of claim 17, wherein the cord is fixedly attached to the inflatable airbag cushion via a cord attachment.

23. An airbag module, comprising:
an inflatable airbag cushion having a cushion membrane with a throat for receiving inflation gas upon deployment;
a first laced vent comprising first opposing vent sides around a first vent aperture in the membrane of the inflatable airbag cushion, wherein the first vent aperture is defined by edges of the first vent sides,
a second laced vent comprising second opposing vent sides around a second vent aperture in the membrane of the inflatable airbag cushion, wherein the second vent aperture is defined by edges of the second vent sides; and
at least one cord coupled to the cushion membrane of the inflatable airbag cushion and having a first laced portion and a second laced portion,
wherein the first laced portion extends across the first vent aperture of the inflatable airbag cushion between the opposing first vent sides and wherein the second laced portion extends across the second vent aperture of the inflatable airbag cushion between the opposing second vent sides such that, upon deployment of the inflatable airbag cushion with obstruction, the cord does not fully extend and the first laced vent and the second laced vent remain open, and upon deployment of the inflatable airbag cushion without obstruction, the cord extends and at least partially closes the first laced vent and the second laced vent, and
wherein the cord is coupled to the cushion membrane at a location such that upon deployment the distance from the location to the throat is greater than the distance from the throat to at least one of the laced vents.

* * * * *